(12) United States Patent
Suetake et al.

(10) Patent No.: US 8,932,119 B2
(45) Date of Patent: Jan. 13, 2015

(54) VEHICLE AIR CONDITIONER

(75) Inventors: Hideki Suetake, Aichi (JP); Toshiyuki Ishida, Hyogo (JP); Masatoshi Mitsui, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 620 days.

(21) Appl. No.: 12/666,952

(22) PCT Filed: Feb. 6, 2009

(86) PCT No.: PCT/JP2009/000490
§ 371 (c)(1),
(2), (4) Date: May 4, 2010

(87) PCT Pub. No.: WO2009/098903
PCT Pub. Date: Aug. 13, 2009

(65) Prior Publication Data
US 2010/0330895 A1    Dec. 30, 2010

(30) Foreign Application Priority Data
Feb. 8, 2008    (JP) ................... 2008-029331

(51) Int. Cl.
*B60H 1/24* (2006.01)
*B60H 1/00* (2006.01)
*B60H 1/32* (2006.01)

(52) U.S. Cl.
CPC ............ *B60H 1/00785* (2013.01); *B60H 1/008* (2013.01); *B60H 1/00849* (2013.01); *B60H 1/3207* (2013.01); *B60H 2001/3245* (2013.01); *B60H 2001/327* (2013.01)
USPC .......................... 454/75; 454/121; 236/44 A

(58) Field of Classification Search
CPC ........................................................ B60H 1/24
USPC .................. 454/74, 75, 121, 127, 135, 74.75; 62/228.4, 244; 236/44 A
See application file for complete search history.

(56) References Cited

U.S. PATENT DOCUMENTS 4,852,363 A * 8/1989 Kampf et al. ................ 62/176.6
4,917,293 A * 4/1990 Fedter et al. ................. 236/49.3
(Continued)

FOREIGN PATENT DOCUMENTS

| JP | 59-23721 A | 2/1984 |
| JP | 4-033004 A | 2/1992 |

(Continued)

OTHER PUBLICATIONS

International Search Report of PCT/JP2009/000490, mailing date of Mar. 3, 2009.
(Continued)

*Primary Examiner* — Kang Hu
*Assistant Examiner* — Anthony Kandare
(74) *Attorney, Agent, or Firm* — Westerman, Hattori, Daniels & Adrian, LLP

(57) ABSTRACT

A vehicle air conditioner that can perform air conditioning operation in an inside air circulating mode while suppressing the mist on a windshield and prevent deterioration in an inside air quality. When exhaust gas concentration on the outside of a vehicle is high, an outside air lead-in mode is switched to an inside air circulating mode and window mist limit humidity at that point is calculated. When inside humidity is close to the window mist limit, a compressor is actuated, the air is blown out from a DEF blowout port into a cabin, or an air volume in a blower is increased to prevent the mist on the windshield and delay switching to the outside air lead-in mode as much as possible. Consequently, air conditioning operation in the inside air circulating mode is performed while the mist on the windshield is suppressed to prevent deterioration in the inside air quality.

4 Claims, 8 Drawing Sheets

(56) References Cited

U.S. PATENT DOCUMENTS

| | | | |
|---|---|---|---|
| 5,259,813 A * | 11/1993 | Abthoff et al. | 454/75 |
| 5,516,041 A * | 5/1996 | Davis et al. | 236/49.3 |
| 6,155,061 A | 12/2000 | Davis, Jr. et al. | |
| 6,168,515 B1 * | 1/2001 | Daimon et al. | 454/75 |
| 6,332,497 B1 * | 12/2001 | Niwa et al. | 165/204 |
| 6,471,581 B1 * | 10/2002 | Hauptmann et al. | 454/75 |
| 6,516,621 B2 * | 2/2003 | Homan et al. | 62/133 |
| 6,659,358 B2 * | 12/2003 | Kamiya et al. | 236/49.3 |
| 6,668,917 B1 * | 12/2003 | Zeng | 165/202 |
| 6,675,597 B2 * | 1/2004 | Ieda et al. | 62/244 |
| 6,701,734 B1 * | 3/2004 | Ogawa | 62/244 |
| 6,931,873 B2 * | 8/2005 | Oomura et al. | 62/228.4 |
| 7,172,018 B2 * | 2/2007 | Katou et al. | 165/204 |
| 7,210,523 B2 * | 5/2007 | Umebayashi et al. | 165/204 |
| 7,325,595 B2 * | 2/2008 | Homan et al. | 165/204 |
| 7,392,838 B2 * | 7/2008 | Errington et al. | 165/204 |
| 7,413,007 B2 * | 8/2008 | Yamaoka | 165/202 |
| 7,725,268 B2 * | 5/2010 | Appelo et al. | 702/23 |
| 7,803,039 B2 * | 9/2010 | Inoue et al. | 454/75 |
| 2002/0197949 A1 * | 12/2002 | Kampf et al. | 454/75 |
| 2003/0209022 A1 | 11/2003 | Ieda et al. | |
| 2004/0177630 A1 * | 9/2004 | Umebayashi et al. | 62/186 |
| 2004/0221594 A1 * | 11/2004 | Suzuki et al. | 62/236 |
| 2005/0121185 A1 | 6/2005 | Yonekura et al. | |
| 2006/0270333 A1 * | 11/2006 | Hirai et al. | 454/75 |
| 2010/0330895 A1 * | 12/2010 | Suetake et al. | 454/75 |

FOREIGN PATENT DOCUMENTS

| | | |
|---|---|---|
| JP | 5-345515 A | 12/1993 |
| JP | 10-119541 A | 5/1998 |
| JP | 2003-326959 A | 11/2003 |
| JP | 2004-268792 A | 9/2004 |
| JP | 2004-322849 A | 11/2004 |
| JP | 2005-067230 A | 3/2005 |
| JP | 2005-219646 A | 8/2005 |
| JP | 2006-290274 A | 10/2006 |
| JP | 2007-8449 A | 1/2007 |
| JP | 4033004 B2 | 1/2008 |

OTHER PUBLICATIONS

Supplementary European Search Report dated Dec. 20, 2011, issued in corresponding European Patent Application No. 09708099.8.

Kafer, O; "PKW-Klimatisierung Unmluftautomatik Mit Feuchteregelung Im Fahrzeuginnenraum"; ATZ Automobiltechnische Zeitschrift, Vieweg Publishing, Wiesbaden, DE, vol. 100, No. 6, Jun. 1, 1998, pp. 436-438, 440, 4, XP000765349. (cited in European Search Report dated Dec. 20, 2011).

Japanese Notice of Allowance dated Mar. 27, 2013, issued in corresponding Japanese Patent Application No. 2008-029331, w/ English translation.

* cited by examiner

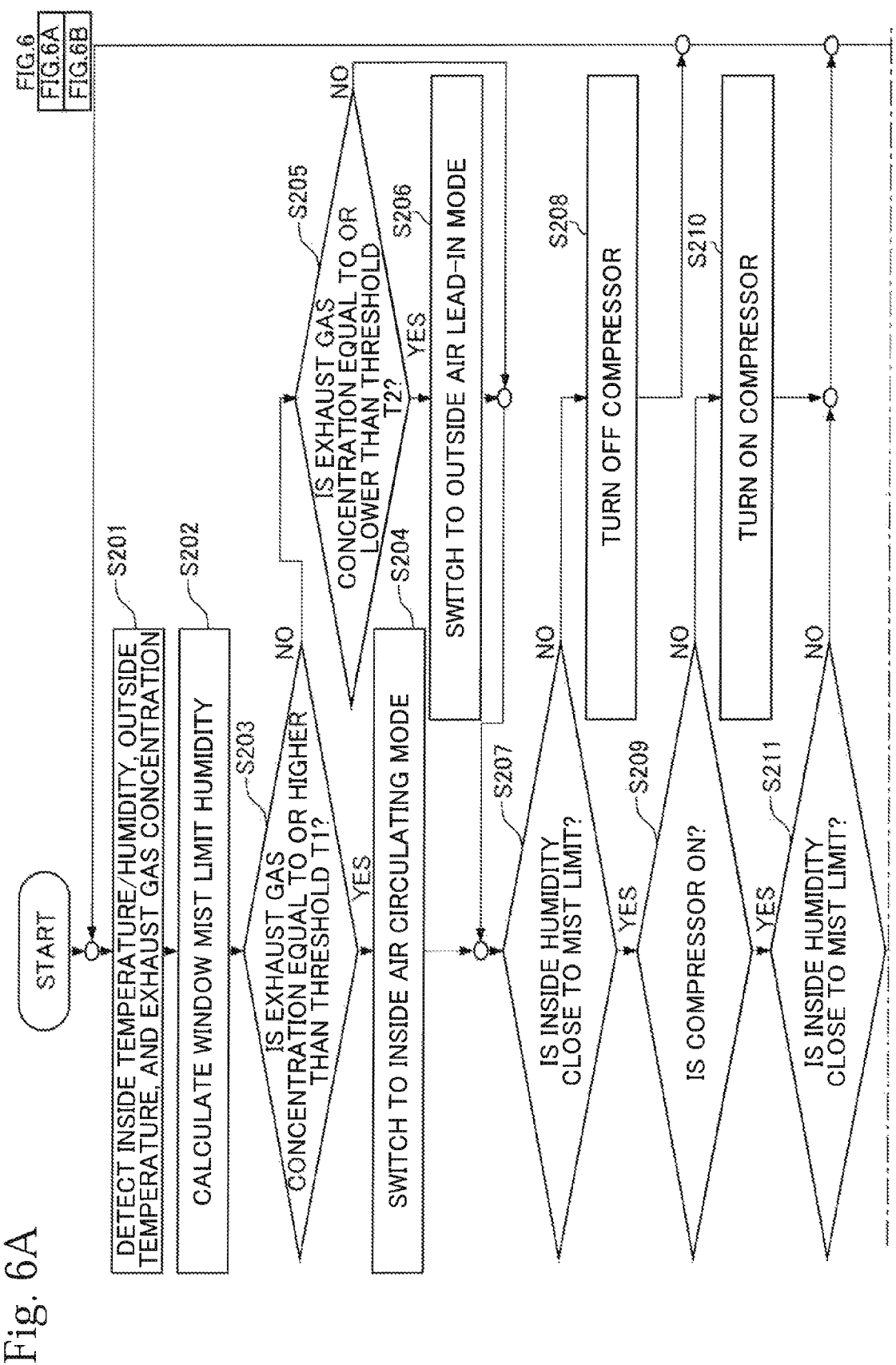

VEHICLE AIR CONDITIONER

TECHNICAL FIELD

The present invention relates to a vehicle air conditioner that performs operation while automatically switching an outside air conditioning mode for leading in the outside air to perform air conditioning and an inside air circulating mode for circulating the air in a vehicle to perform air conditioning.

BACKGROUND ART

In an air conditioner for automobile, there are an outside air lead-in mode for performing air conditioning operation while leading in the outside air from the outside of a vehicle and an inside air circulating mode for circulating the air in the vehicle to perform air conditioning operation without leading in the outside air from the outside of the vehicle. It is possible to prevent deterioration in an inside air quality by usually setting the outside air lead-in mode and, for example, when an exhaust gas odor from the outside of the vehicle is disturbing, switching the outside air lead-in mode to the inside air circulating mode to block intrusion of the exhaust gas.

In recent years, an air conditioner that automatically performs such mode switching of the outside air lead-in mode and the inside air circulating mode by detecting an exhaust gas component in the lead-in outside air has already been proposed (see, for example, Patent Document 1).

Patent Document 1: Japanese Patent Laid-Open No. 2004-268792

DISCLOSURE OF THE INVENTION

Problems to be Solved by the Invention

When the air conditioning operation is performed in the inside air circulating mode, occurrence of the mist on a windshield of the vehicle is a problem. To suppress the mist on the windshield, it is necessary to actuate a compressor and perform dehumidification of the inside air. This is because, usually, the compressor is not actuated in the inside air circulating mode. Therefore, in the technique described in Patent Document 1, the compressor is actuated even in the inside air circulating mode according to the humidity on the interior side of the windshield to prevent the mist on the windshield.

However, when the humidity of the interior side of the windshield is close to the humidity at which the mist occurs, the operation is performed in the outside air lead-in mode without switching the outside air lead-in mode to the inside air circulating mode. As a result, the exhaust air on the outside of the vehicle intrudes into the vehicle and a quality of the air in the vehicle (hereinafter referred to as inside air quality) is easily deteriorated.

In a hybrid automobile that uses both a gasoline engine and a motor, an electric automobile, a fuel cell automobile, and the like, a compressor of an air conditioner is driven by an electric motor rather than an engine. When the compressor is driven by the engine, waste heat of this engine can be used for a heat source for heating. However, when the electric motor is used, the waste heat of the engine cannot be used (in some case, the engine itself is not present). Therefore, energy for actuating the electric motor is also necessary to perform heating. This hinders extension of a traveling distance. There is a demand for development of a technique for performing comfortable air conditioning while realizing power saving.

The present invention has been accomplished on the basis of such technical problems and it is an object of the present invention to provide a vehicle air conditioner that can perform the air conditioning operation in the inside air circulating mode while suppressing the mist on the windshield and prevent deterioration in the inside air quality.

It is another object of the present invention to provide a vehicle air conditioner that can perform the air conditioning operation in the inside air circulating mode, even when the compressor is driven by the electric motor, while realizing power saving and while suppressing the mist on the windshield and prevent deterioration in the inside air quality.

Means for Solving the Problems

Under such objects, the present invention provides a vehicle air conditioner comprising a control unit that switches an outside air conditioning mode for leading in the outside air to perform air conditioning and an inside air circulating mode for circulating the air in a vehicle to perform air conditioning, wherein the control unit calculates surface temperature on an interior side of a window glass on the basis of, among outside temperature, inside temperature, and vehicle speed, at least the outside temperature and the inside temperature, sets window mist occurrence limit humidity at which the mist occurs on the window glass from absolute humidity at which dews concentrate at the surface temperature, and, when inside humidity is within a predetermined range with respect to the mist occurrence limit humidity, performs operation control for reducing the inside humidity.

As the operation control for reducing the inside humidity, any control may be performed. However, for example, the control unit can control at least one of actuation of a compressor that circulates a coolant to an evaporator, a blowing-out direction of the air into the vehicle, and an air volume. More specifically, when the compressor is engine-driven, the control unit executes at least one of switching of the compressor to ON, setting of a blowing-out direction of the air toward the surface on the interior side of the window glass, and an increase in the air volume. When the compressor is electrically-driven, the control unit executes at least one of an increase in the number of revolutions of the compressor, setting of a blowing-out direction of the air toward the surface on the interior side of the window glass, and an increase in the air volume.

Such control using the inside humidity and the mist occurrence limit humidity is effectively executed when the air conditioning is performed in the inside air circulating mode in which the mist tends to occur. The control unit performs the air conditioning while switching the inside air circulating mode to the outside air lead-in mode only when the inside humidity is within the predetermined range with respect to the mist occurrence limit humidity as a result of performing all kinds of operation control for reducing the inside humidity. This makes it possible to continue the inside air circulating mode as long as possible.

When the exhaust gas concentration in the outside air is equal to or higher than a predetermined level, the air conditioning is performed in the inside air circulating mode. In particular, in this case, it is possible to continue the inside air circulating mode as long as possible and prevent intrusion of the exhaust gas into the vehicle by performing operation control for reducing the inside humidity when the inside humidity is within the predetermined range with respect to the mist occurrence limit humidity and preventing the mist on the window glass from easily occurring.

Advantages of the Invention

According to the present invention, when the exhaust gas concentration on the outside of the vehicle is high, the outside air lead-in mode is switched to the inside air circulating mode and window mist limit humidity at that point is calculated. When inside humidity is close to the window mist limit, the compressor is actuated, the air is blown against the interior surface side of the window glass, or the air volume is increased to prevent the mist on the window glass. This makes it possible to delay the switching to the outside air lead-in mode as much as possible. As a result, it is possible to continuously perform the air conditioning operation in the inside air circulating mode while suppressing the mist on the window glass and prevent deterioration in the inside air quality.

When the compressor is electrically driven, only when the inside humidity is close to the window mist limit even if the compressor is actuated, the number of revolutions of the compressor is increased to suppress the mist from occurring on the window glass. In other words, if the inside humidity falls below the window mist limit, control for not further increasing the number of revolutions of the compressor can be performed and an increase in power consumption can be suppressed. As a result, even when the compressor is electrically driven, it is possible to perform the air conditioning operation in the inside air circulating mode to prevent deterioration in the inside air quality and perform comfortable air conditioning while realizing power saving and while suppressing the mist on the window glass.

BRIEF DESCRIPTION OF THE DRAWINGS

FIGS. 6A and 6B are a diagram showing a flow of control of the air conditioner in the second embodiment.

DESCRIPTION OF SYMBOLS 10A, 10B . . . air conditioners (vehicle air conditioners), 11E, 11F . . . compressors, 15 . . . evaporator, 16 . . . blower, 17 . . . heater, 18 . . . housing, 19 . . . outside air intake port, 20 . . . inside air intake port, 21 . . . intake port switching damper, 22 . . . DEF blowout port, 23 . . . FACE blowout port, 24 . . . FOOT blowout port, 25, 26 . . . blowout port switching dampers, 30A, 30B . . . control systems (control units), 31 . . . exhaust gas sensor, 32 . . . inside temperature/humidity sensor, 33 . . . outside temperature sensor, 34, 35, 36 . . . actuators, 37 . . . air volume control device, 38 . . . driving relay, 40 . . . number of revolution control device

BEST MODE FOR CARRYING OUT THE INVENTION

The present invention is explained in detail below on the basis of embodiments shown in the accompanying drawings.

First Embodiment

Figure 1:
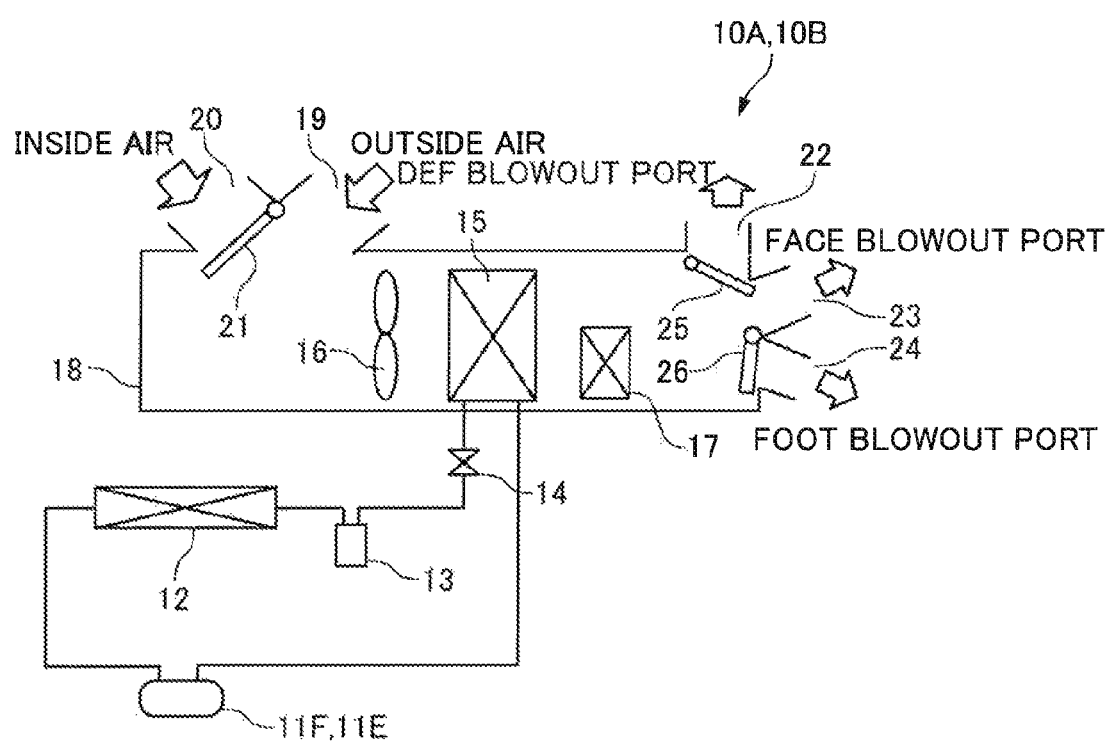
FIG. 1 is a diagram showing the configuration of an air conditioner in an embodiment of the present invention.

The schematic configuration of an air conditioner for automobile is shown in FIG. 1.

As shown in FIG. 1, in an air conditioner for automobile (a vehicle air conditioner) 10A, a coolant circulates among a compressor 11F, a capacitor 12, a receiver 13, an expansion valve 14, and an evaporator 15. The coolant that performs heat exchange with the outside air to be cooled in the capacitor 12 performs heat exchange with the air fed by a blower 16 in the evaporator 15, whereby the air conditioner 10A delivers the cooled air into a vehicle. A heater 17 using cooling water of an engine as a heat source is provided. The cooling water performs heat exchange with the air fed by the blower 16, whereby the air conditioner 10A can also feed the heated air into the vehicle.

In a housing 18 incorporating the evaporator 15 and the heater 17, an outside air intake port 19 for taking in the outside air from the outside of the vehicle and an inside air intake port 20 for taking in the air from the inside of the vehicle are provided. An intake port switching damper 21 switches whether the intake of the air into the housing 18 is performed from the outside air intake port 19 or performed from the inside air intake port 20.

As blowout ports for the air from the inside of the housing 18 into the vehicle, the air conditioner 10A comprises at least a DEF blowout port 22 for blowing out the air toward the surface on the interior side of a windshield, a FACE blowout port 23 for blowing out the air toward the upper half of the body of a passenger seated on a seat in the vehicle, and a FOOT blowout port 24 for blowing out the air toward the feet of the passenger seated on the seat in the vehicle. The blowout of the air from the DEF blowout port 22, the FACE blowout port 23, and the FOOT blowout port 24 are switched by blowout port switching dampers 25 and 26.

The air conditioner 10A in this embodiment drives the compressor 11F with an engine.

Figure 2:
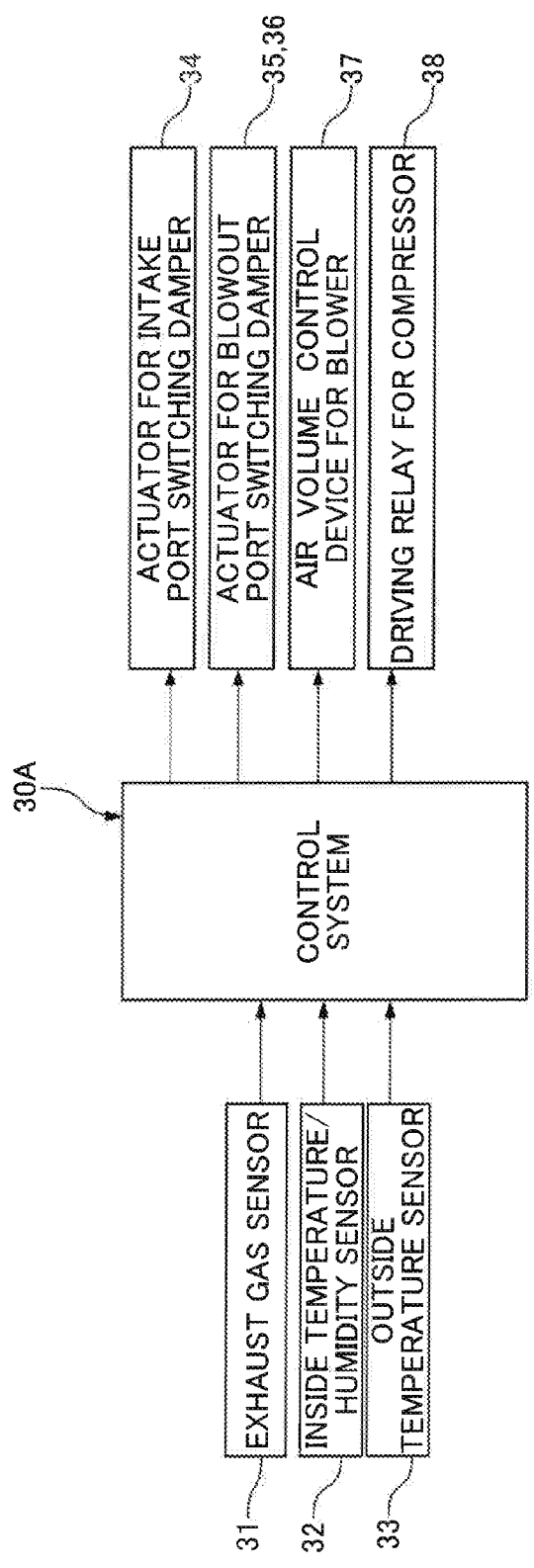
FIG. 2 is a diagram showing the configuration of a control system for an air conditioner in a first embodiment.

FIG. 2 is a diagram showing the configuration of a control system 30A for controlling the air conditioner 10A. As shown in FIG. 2, the control system 30A controls, on the basis of detection data from an exhaust gas sensor 31 that detects the exhaust gas concentration of an automobile, an inside temperature/humidity sensor 32 that detects the temperature and humidity in the vehicle, and an outside temperature sensor 33 that detects outside temperature, actuation of actuators 34, 35, and 36 for actuating the intake port switching damper 21 and the blowout port switching dampers 25 and 26, an air volume control device 37 for the blower 16, and a driving relay 38 for the compressor 11F.

Content of the control is specifically explained below.

Figure 3A:
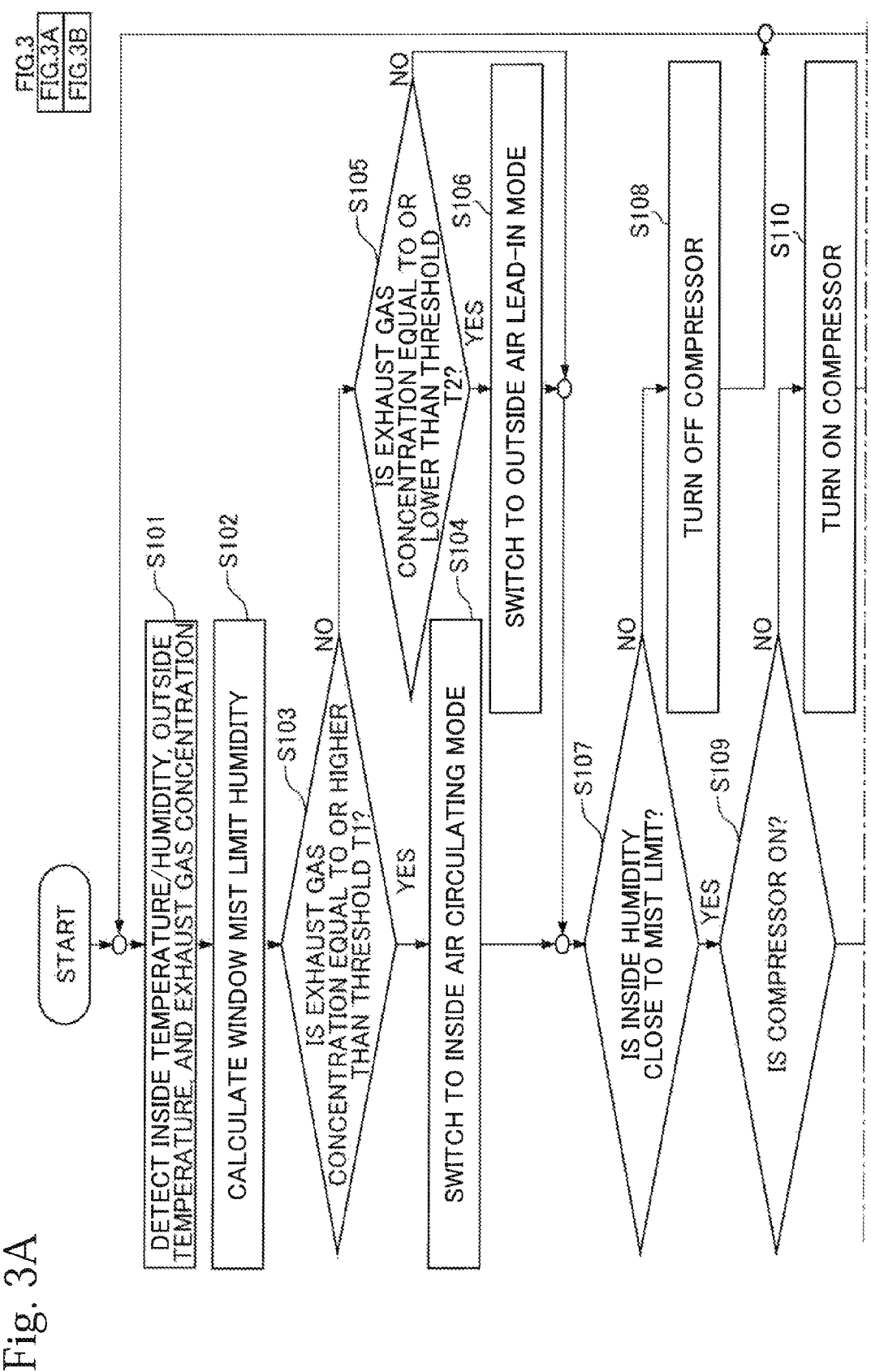
FIGS. 3A and 3B are a diagram showing a flow of control of the air conditioner in the first embodiment.
Figure 3B:
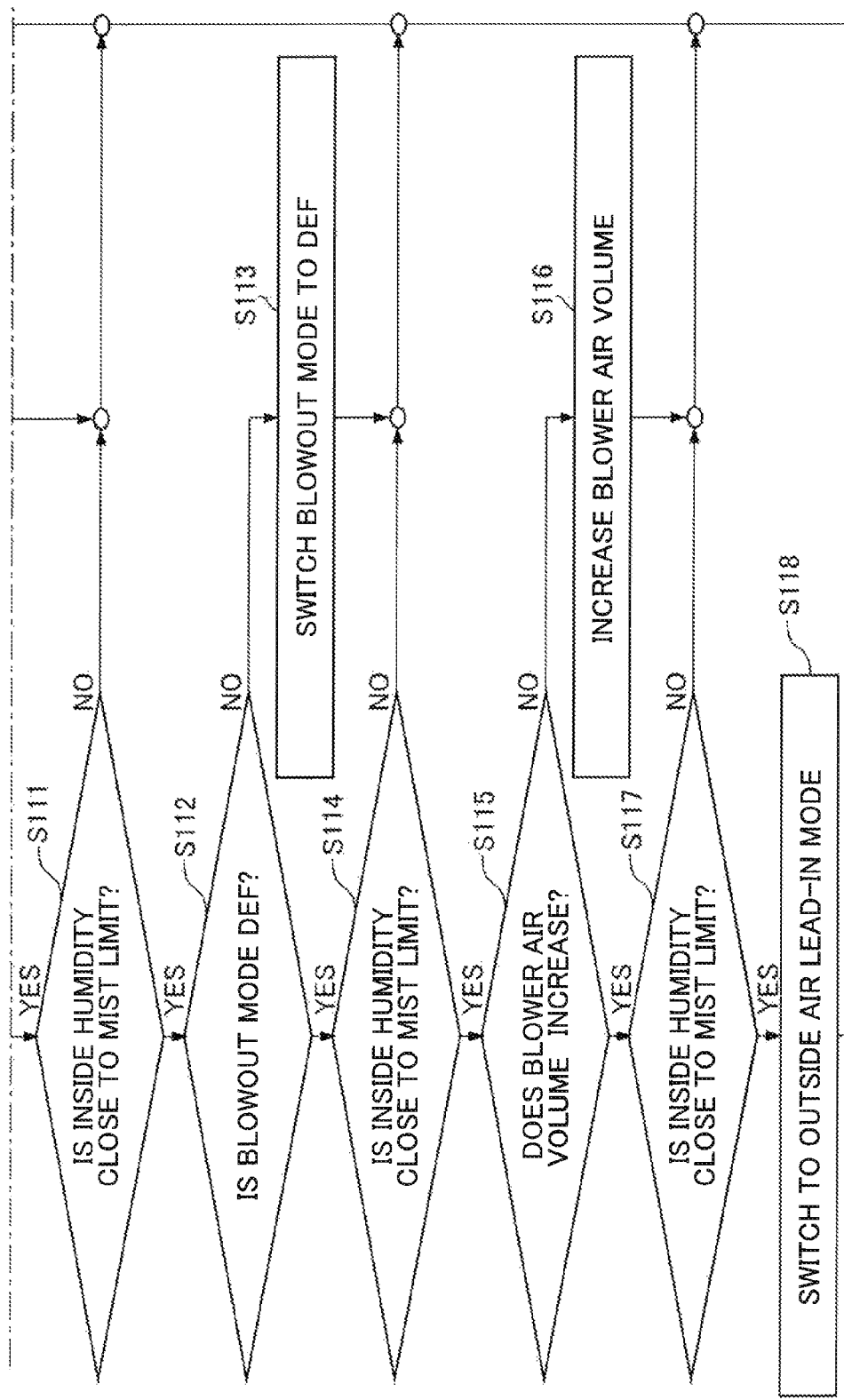

First, as shown in FIG. 3, when heating operation is started, first, the control system 30A detects the exhaust gas concentration on the outside of the vehicle, inside temperature, inside humidity, and outside temperature at that point using the exhaust gas sensor 31, the inside temperature/humidity sensor 32, and the outside temperature sensor 33 (step S101).

Subsequently, the control system 30A calculates window mist limit humidity Hin on an interior side of a windshield from the inside temperature, the inside humidity, and the outside temperature detected in step S101 (step S102).

Figure 4:
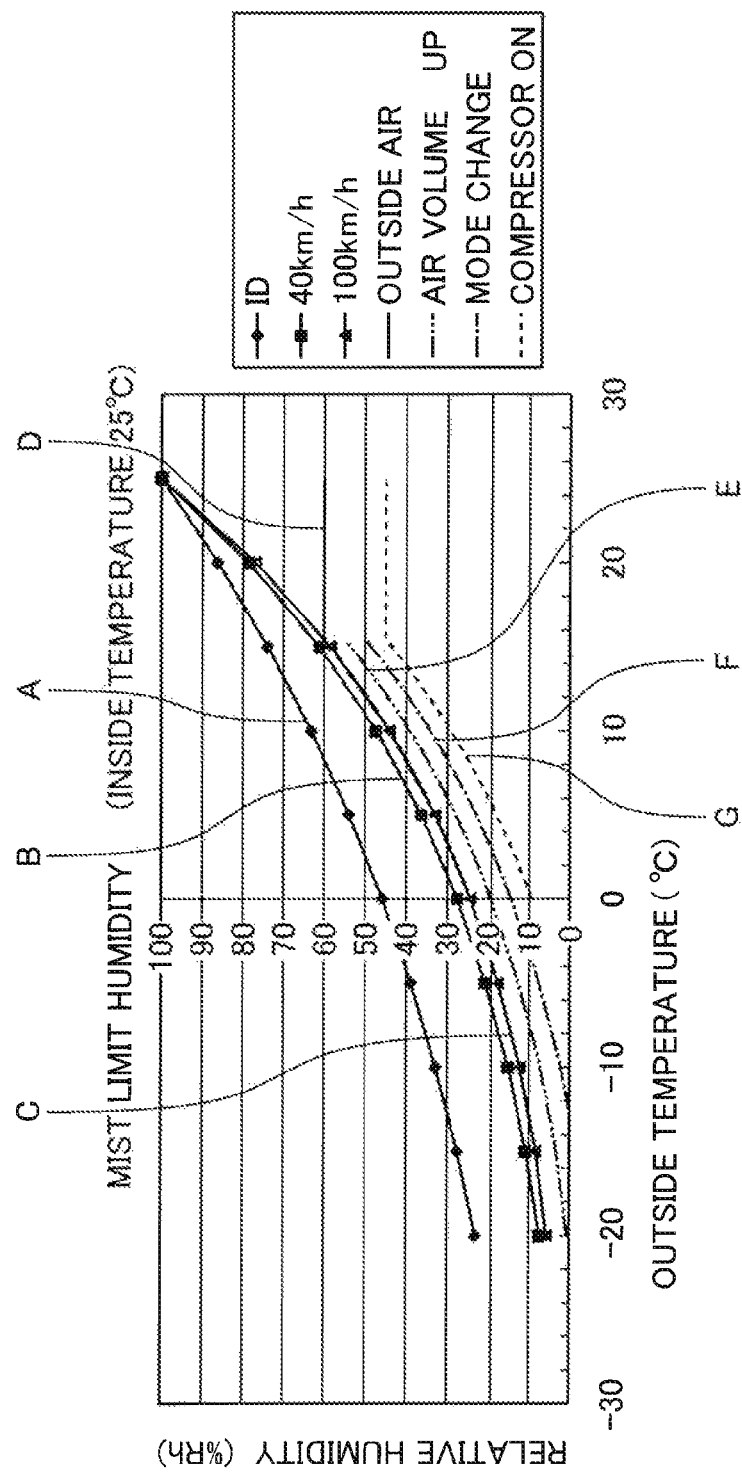
FIG. 4 is a diagram showing a relation between outside temperature and window mist limit humidity for each vehicle speed.

The window mist limit humidity Hin depends on vehicle speed Vs, outside temperature Ta, inside temperature Tin, and thermal conductivity L of the windshield. A relation between the outside temperature Ta and the window mist limit humidity Hin at the inside temperature Tin=25° in a specific windshield is shown in FIG. 4. In FIG. 4, a sign A, a sign B, and a sign C respectively indicate relations between the outside temperature Ta and the window mist limit humidity Hin at the time when the vehicle speed Vs is 0 km/h, 40 km/h, and 100 km/h.

In an example shown in FIG. 4, at the vehicle seed of 100 km/h, when an operation mode of the air conditioner 10A is set in an outside air lead-in mode, a relation between outside temperature and inside humidity is as indicated by a sign D. In this state, when an air volume is increased, the relation between the outside temperature and the inside humidity changes as indicated by a sign E and the humidity falls. In a mode in which a blowout port is the DEF blowout port 22, the relation between the outside temperature and the inside humidity changes as indicated by a sign F and the humidity further falls. When the compressor 11F is actuated (heat exchange is performed by the coolant in the evaporator 15 to dehumidify the inside of the vehicle), the relation between the outside temperature and the inside humidity changes as indicated by a sign G and the humidity further falls.

The control system 30A calculates the window mist limit humidity Hin on the windshield from the outside temperature Ta, the inside temperature Tin, and the inside humidity Hs actually detected in step S101 as explained below.

First, the control system 30A calculates interior side surface temperature Ts of the windshield. The interior side surface temperature Ts is calculated by a predetermined function: Ts=f(Vs, Ta, Tin, L).

The function is a function for calculating the interior side surface temperature Ts of the windshield from the thermal conductivity and the thickness of the windshield assuming that, on the outside air side of the windshield, the air having temperature same as the outside temperature flows at speed same as vehicle speed and, on the interior side, the air having temperature same as the inside air temperature flows at a flow rate based on measurement.

As shown in FIG. 4, although the window mist limit humidity Hin is different depending on the vehicle speed Vs, the vehicle speed Vs may sequentially change during traveling. To simplify the control, in this embodiment, the vehicle speed Vs is fixed to maximum working speed (e.g., 100 km/h) assumed in the vehicle. The maximum working speed only has to be appropriately set according to the vehicle. It goes without saying that it is also possible to acquire a detection value of the vehicle speed Vs from a vehicle speed sensor on the vehicle side and calculate the window mist limit humidity Hin at any time according to the vehicle speed Vs at that point.

The thermal conductivity L of the windshield is known. Therefore, the interior side surface temperature Ts is calculated as a function of the outside temperature Ta and the inside temperature Tin.

Subsequently, the control system 30A calculates absolute humidity Xs at the time when relative humidity Hs is 100% at the calculated interior side surface temperature Ts of the windshield according to a function Xs=f(Ts, Hs). This function can be set by a well-known approximation formula of a humid air diagram.

The control system 30A calculates the window mist limit humidity Hin from the calculated absolute humidity Xs and the inside temperature Tin detected in step S101 according to a function Hin=f(Xs, Tin). This function can also be set by the well-known approximation formula of the humid air diagram.

This makes it possible to calculate the window mist limit humidity Hin.

Subsequently, the control system 30A determines whether the exhaust gas concentration detected in step S101 is equal to or higher than a predetermined threshold T1 (step S103). When the exhaust gas concentration is equal to or higher than the threshold T1 as a result of the determination, the control system 30A switches the intake port switching damper 21 and switches the outside air lead-in mode to the inside air circulating mode for taking in the air in the vehicle from the inside air intake port 20 without taking the outside air into the housing 18 from the outside air intake port 19 (step S104).

On the other hand, when the exhaust gas concentration is not equal to or higher than the threshold T1, the control system 30A continues the outside air lead-in mode for taking the outside air into the housing 18 from the outside air intake port 19 without switching the intake port switching damper 21. At this point, the control system 30A determines, using a threshold T2 for exhaust gas concentration lower than the threshold T1 in step S103 as a condition for switching the inside air circulating mode to the outside air lead-in mode, whether the exhaust gas concentration detected in step S101 is equal to or lower than this threshold T2. Only when the exhaust gas concentration is equal to or lower than the threshold T2 as a result of the determination, the control system 30A switches the intake port switching damper 21 to switch the inside air circulating mode to the outside air lead-in mode. When the exhaust gas concentration exceeds the threshold T2, it is also possible not to switch the operation mode at that point (steps S105 to S106).

Subsequently, the control system 30A compares the inside humidity detected in step S101 and the window mist limit humidity calculated in step S102 and determines whether the inside humidity exceeds a reference value set with the window mist limit humidity as a reference (step S107). In other words, the control system 30A determines whether the inside humidity is within a range set with the window mist limit humidity as a reference. For example, a reference value is set as (HL-5) (%) with respect to the window mist limit humidity HL (%) in advance. The control system 30A determines whether the inside humidity exceeds the reference value.

When the inside humidity at that point does not exceed the reference value as a result of the determination, the control system 30A turns off the driving relay 38 and turns off the compressor 11F (step S108). After turning off the compressor 11F, the control system 30A returns to step S101.

On the other hand, when the inside humidity at that point exceeds the reference value and is close to the window mist limit humidity, the control system 30A determines whether the compressor 11F is on. After the determination, when the compressor 11F is off, the control system 30A switches the driving relay 38 to ON and actuates the compressor 11F (steps S109 and S110). When the compressor 11F operates, the coolant circulates among the compressor 11F, the capacitor 12, the receiver 13, the expansion valve 14, and the evaporator 15. The coolant and the air in the housing 18 perform heat exchange in the evaporator 15. Consequently, dehumidification of the air is performed, the inside humidity falls, and the windshield is less easily misted. After turning on the compressor 11F, the control system 30A returns to step S101.

When it is determined in step S109 that the compressor 11F is on, subsequently, as in step S107, the control system 30A compares the inside humidity detected in step S101 and the window mist limit humidity calculated in step S102 and determines whether the inside humidity exceeds the reference value set with the window mist limit humidity as a reference (step S111). For example, the reference value is set as (HL-5) (%) with respect to the window mist limit humidity HL (%) in advance. The control system 30A determines whether the inside humidity exceeds the reference value.

When the inside humidity at that point exceeds the reference value and is close to the window mist limit humidity as a result of the determination, the control system 30A determines whether a blowout mode is a DEF mode (blowout from the DEF blowout port 22). After the determination, when the blowout mode is other than the DEF mode, the control system 30A switches the blowout port switching dampers 25 and 26 to blow out the air from the DEF blowout port 22 into a cabin and changes the blowout mode to the DEF mode (steps S112 and S113). Consequently, the air is blown against the inner side of the windshield, the temperature on the inner side of the windshield falls, the humidity near the inner side of the windshield falls, and the windshield is less easily misted. Thereafter, the control system 30A returns to step S101.

On the other hand, when the inside humidity at that point does not exceed the reference value in step S111, the control system 30A returns to step S101.

When it is determined in step S112 that the blowout mode is the DEF mode, subsequently, as in step S107, the control system 30A compares the inside humidity detected in step S101 and the window mist limit humidity calculated in step S102 and determines whether the inside humidity exceeds the reference value set with the window mist limit humidity as a reference (step S114). For example, the reference value is set as (HL-5) (%) with respect to the window mist limit humidity HL (%) in advance. The control system 30A determines whether the inside humidity exceeds the reference value.

When the inside humidity at that point exceeds the reference value and is close to the window mist limit humidity as a result of the determination, the control system 30A determines whether the air volume of the blower 16 has already increased. When the air volume of the blower 16 has not already increased, the control system 30A increases the number of revolutions of the blower 16 to increase the volume of the air fed to the evaporator 15, i.e., the air volume (steps S115 and S116). Thereafter, the control system 30A returns to step S101.

On the other hand, when the inside humidity at that point does not exceed the reference value in step S114, the control system 30A returns to step S101.

When it is determined in step S115 that the air volume of the blower 16 has already increased, subsequently, as in step S107, the control system 30A compares the inside humidity detected in step S101 and the window mist limit humidity calculated in step S102 and determines whether the inside humidity exceeds the reference value set with the window mist limit humidity as a reference (step S117). For example, the reference value is set as (HL-5) (%) with respect to the window mist limit humidity HL (%) in advance. The control system 30A determines whether the inside humidity exceeds the reference value.

When the inside humidity at that point exceeds the reference value and is close to the window mist limit humidity as a result of the determination, the control system 30A switches the intake port switching damper 21 and switches the inside air circulating mode to the outside air lead-in mode for taking the outside air into the housing 18 from the outside air intake port 19 (step S118). In other words, when the outside air lead-in mode is switched to the inside air circulating mode in step S104, the control system 30A switches the inside air circulating mode to the outside air lead-in mode in step S118 for the first time.

On the other hand, when the inside humidity at that point does not exceed the reference value, the control system 30A returns to step S101.

With such a configuration, when the exhaust gas concentration on the outside of the vehicle is high, the control system 30A switches the external air lead-in mode to the inside air circulating mode and calculates window mist limit humidity at that point. When the inside humidity is close to the calculated window mist limit humidity, the control system 30A actuates the compressor 11F, blows out the air from the DEF blowout port 22 into the cabin, and increases the air volume in the blower 16 to prevent the mist on the windshield and delays the switching to the external air lead-in mode as much as possible. This makes it possible to continuously perform the air conditioning operation in the inside air circulating mode as much as possible while suppressing the mist on the windshield and prevent deterioration in the inside air quality.

Second Embodiment

Next, a second embodiment of the present invention is explained. In the second embodiment explained below, an air conditioner (a vehicle air conditioner) 10B of a system for driving the compressor 11F with an electric motor is explained as an example. In the following explanation, components common to those of the air conditioner 10A in the first embodiment are denoted by the same reference numerals and signs and explanation of the components is omitted.

As shown in FIG. 1, the overall configuration of the air conditioner 10B is common to the air conditioner 10A in the first embodiment. A difference from the air conditioner 10A is that a compressor 11E is driven by a not-shown electric motor rather than being driven by an engine. The heater 17 shown in FIG. 1 may not be provided in the air conditioner 10B in this embodiment depending on a vehicle.

Figure 5:
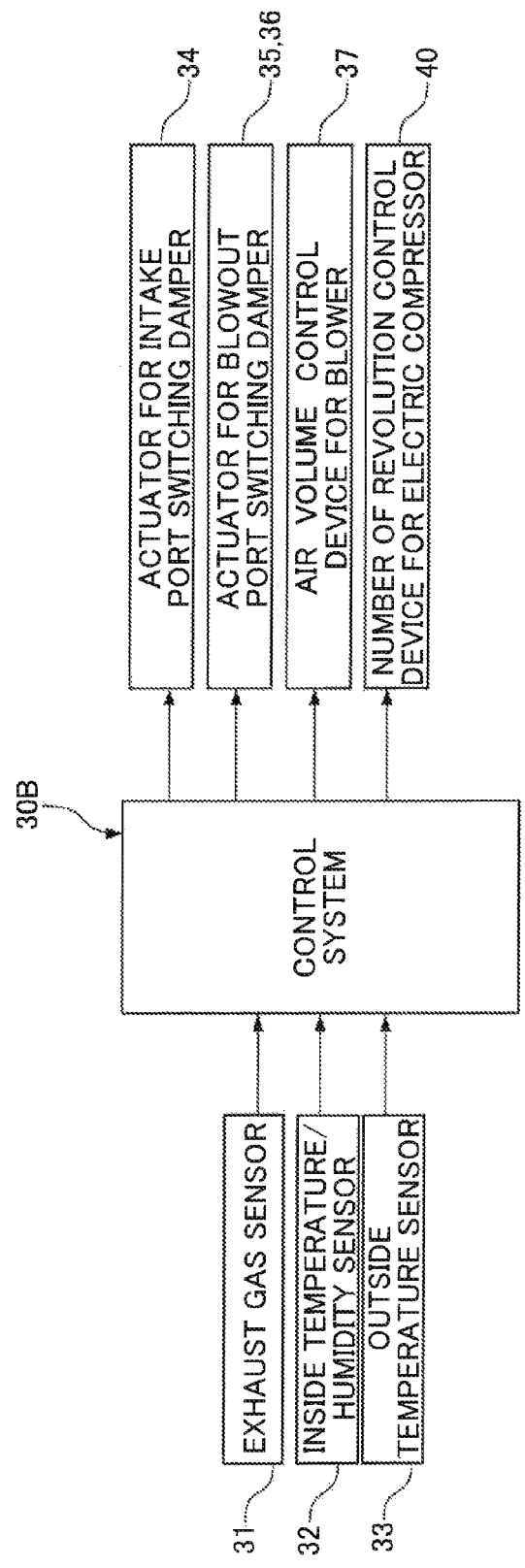
FIG. 5 is a diagram showing the configuration of a control system for an air conditioner in a second embodiment.

FIG. 5 is a diagram showing the configuration of a control system 30B for controlling the air conditioner 10B. As shown in FIG. 5, the control system 30B controls, on the basis of detection data from the exhaust gas sensor 31 that detects the exhaust gas concentration of an automobile, the inside temperature/humidity sensor 32 that detects the temperature and humidity in the vehicle, and the outside temperature sensor 33 that detects outside temperature, actuation of actuators 34, 35, and 36 for actuating the intake port switching damper 21 and the blowout port switching dampers 25 and 26, the air volume control device 37 for the blower 16, and a number of revolution control device 40 that controls the number of revolutions of a motor that drives the compressor 11E.

Content of the control is specifically explained below.

Figure 6B:
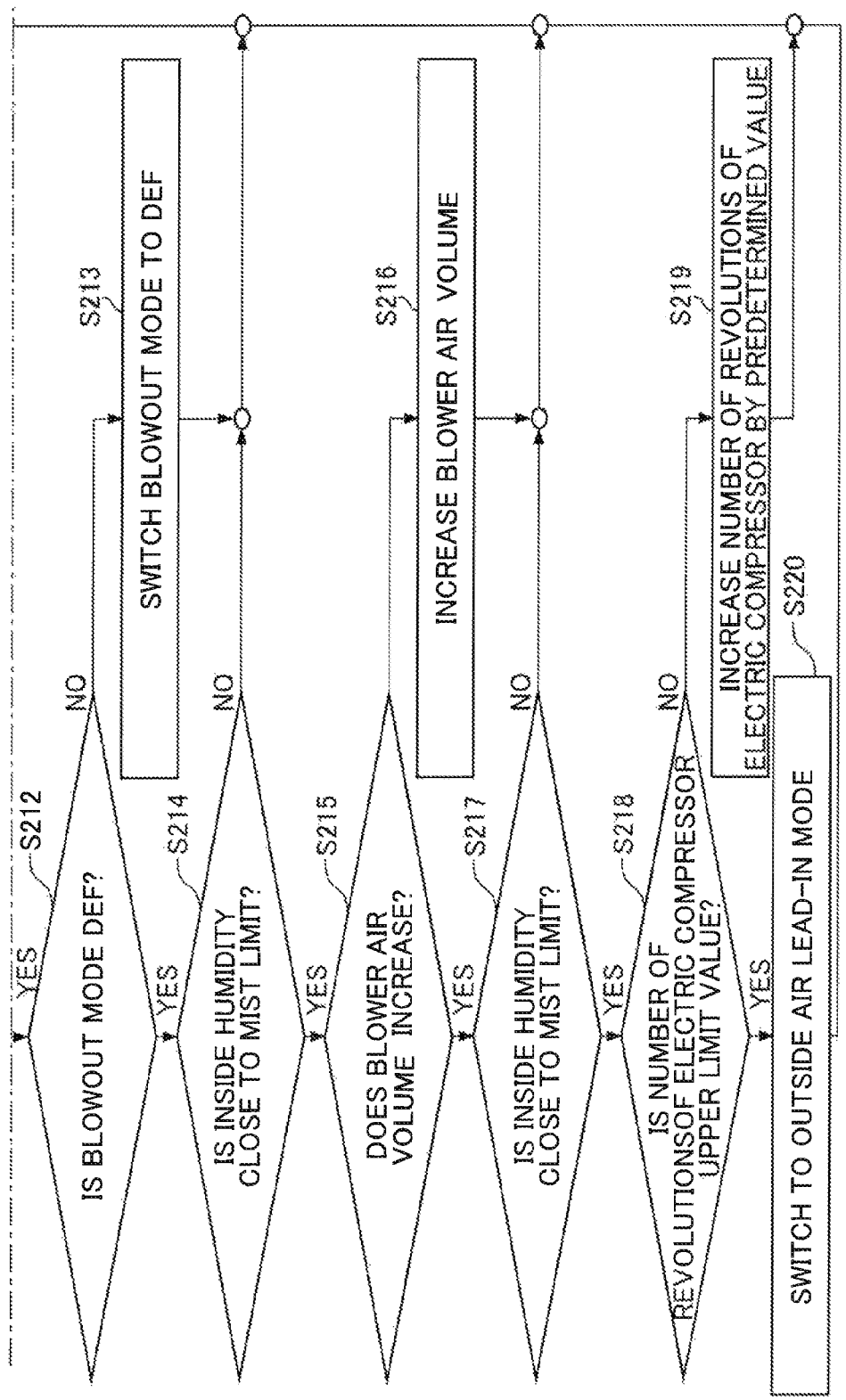

First, as shown in FIG. 6, when heating operation is started, first, the control system 30B detects the exhaust gas concentration on the outside of the vehicle, inside temperature, inside humidity, and outside temperature at that point using the exhaust gas sensor 31, the inside temperature/humidity sensor 32, and the outside temperature sensor 33 (step S201).

Subsequently, the control system 30B calculates the window mist limit humidity Hin on an interior side of a windshield from the inside temperature, the inside humidity, and the outside temperature detected in step S201 (step S202). A method of calculating the window mist limit humidity Hin is the same as that in the first embodiment.

Subsequently, the control system 30B determines whether the exhaust gas concentration detected in step S201 is equal to or higher than the predetermined threshold T1 (step S203). When the exhaust gas concentration is equal to or higher than the threshold T1 as a result of the determination, the control system 30B switches the intake port switching damper 21 and switches the outside air lead-in mode to the inside air circulating mode for taking in the air in the vehicle from the inside air intake port 20 without taking the outside air into the housing 18 from the outside air intake port 19 (step S204).

On the other hand, when the exhaust gas concentration is not equal to or higher than the threshold T1, the control system 30B continues the outside air lead-in mode for taking the outside air into the housing 18 from the outside air intake port 19 without switching the intake port switching damper 21. At this point, the control system 30B determines, using the threshold T2 for exhaust gas concentration lower than the threshold T1 in step S203 as a condition for switching the inside air circulating mode to the outside air lead-in mode, whether the exhaust gas concentration detected in step S201 is equal to or lower than this threshold T2. Only when the exhaust gas concentration is equal to or lower than the threshold T2, the control system 30B switches the intake port switching damper 21 to switch the inside air circulating mode to the outside air lead-in mode. When the exhaust gas concentration exceeds the threshold T2, it is also possible not to switch the operation mode at that point (steps S205 to S206).

Subsequently, the control system 30B compares the inside humidity detected in step S201 and the window mist limit humidity calculated in step S202 and determines whether the inside humidity exceeds a reference value set with the window mist limit humidity as a reference (step S207). For example, a reference value is set as (HL-5) (%) with respect to the window mist limit humidity HL (%) in advance. The control system 30B determines whether the inside humidity exceeds the reference value.

When the inside humidity at that point does not exceed the reference value as a result of the determination, the control system 30B turns off the number of revolution control device 40 and turns off the compressor 11E (step S208). After turning off the compressor 11E, the control system 30B returns to step S201.

On the other hand, when the inside humidity at that point exceeds the reference value and is close to the window mist limit humidity, the control system 30B determines whether the compressor 11E is on. After the determination, when the compressor 11E is off, the control system 30B controls the not-shown motor with the number of revolution control device 40 and actuates the compressor 11E (steps S209 and S210). The number of revolution control device 40 can switch the number of revolutions of the compressor 11E in plural stages. When the compressor 11E is actuated in step S209, the number of revolutions of the compressor 11E is suppressed to the number of revolutions in a lowest stage. According to the actuation of the compressor 11E, the coolant circulates among the compressor 11E, the capacitor 12, the receiver 13, the expansion valve 14, and the evaporator 15. The coolant and the air in the housing 18 perform heat exchange in the evaporator 15 to perform dehumidification of the air. Consequently, the inside humidity falls and the windshield is less easily misted. After turning on the compressor 11E, the control system 30B returns to step S201.

When it is determined in step S209 that the compressor 11E is on, subsequently, as in step S207, the control system 30B compares the inside humidity detected in step S201 and the window mist limit humidity calculated in step S202 and determines whether the inside humidity exceeds the reference value set with the window mist limit humidity as a reference (step S211). For example, the reference value is set as (HL-5) (%) with respect to the window mist limit humidity HL (%) in advance. The control system 30B determines whether the inside humidity exceeds the reference value.

When the inside humidity at that point exceeds the reference value and is close to the window mist limit humidity as a result of the determination, the control system 30B determines whether the blowout mode is the DEF mode. After the determination, when the blowout mode is other than the DEF mode, the control system 30B switches the blowout port switching dampers 25 and 26 to blow out the air from the DEF blowout port 22 into a cabin (steps S212 and S213). Consequently, the air flows to the interior side of the windshield and the windshield is less easily misted. Thereafter, the control system 30B returns to step S201.

On the other hand, when the inside humidity at that point does not exceed the reference value in step S211, the control system 30B returns to step S201.

When it is determined in step S212 that the blowout mode is the DEF mode, subsequently, as in step S207, the control system 30B compares the inside humidity detected in step S201 and the window mist limit humidity calculated in step S202 and determines whether the inside humidity exceeds the reference value set with the window mist limit humidity as a reference (step S214). For example, the reference value is set as (HL-5) (%) with respect to the window mist limit humidity HL (%) in advance. The control system 30B determines whether the inside humidity exceeds the reference value.

When the inside humidity at that point exceeds the reference value and is close to the window mist limit humidity as a result of the determination, the control system 30B determines whether the air volume of the blower 16 has already increased. When the air volume of the blower 16 has not increased, the control system 30B increases the number of revolutions of the blower 16 to increase the volume of the air fed to the evaporator 15, i.e., the air volume (steps S215 and S216). Thereafter, the control system 30B returns to step S201.

On the other hand, when the inside humidity at that point does not exceed the reference value in step S214, the control system 30B returns to step S201.

When it is determined in step S215 that the air volume of the blower 16 has already increased, subsequently, as in step S207, the control system 30B compares the inside humidity detected in step S201 and the window mist limit humidity calculated in step S202 and determines whether the inside humidity exceeds the reference value set with the window mist limit humidity as a reference (step S217). For example, the reference value is set as (HL-5) (%) with respect to the window mist limit humidity HL (%) in advance. The control system 30B determines whether the inside humidity exceeds the reference value.

When the inside humidity at that point does not exceed the reference value, the control system 30B returns to step S201.

On the other hand, when the inside humidity at that point exceeds the reference value and is close to the window mist limit humidity, the control system 30B determines whether the number of revolutions of the motor, which drives the compressor 11E, has reached a predetermined upper limit value (step S218). When the number of revolutions has not reached the upper limit value, the number of revolution control device 40 increases the number of revolutions of the motor, which drives the compressor 11E, by the predetermined number of revolutions in order to increase the number of revolutions of the motor by one stage (step S219). Consequently, only when the inside humidity is close to the window mist limit, the number of revolution control device 40 increases the number of revolutions of the compressor 11E and suppresses the mist from occurring on the windshield. In other words, when the inside humidity falls below the window mist limit, the number of revolution control device 40 performs control for not further increasing the number of revolutions of the compressor 11E.

On the other hand, when the number of revolutions of the motor, which drives the compressor 11E, has reached the predetermined upper limit value in step S218, the control system 30B switches the intake port switching damper 21, switches the inside air circulating mode to the outside air lead-in mode for taking the outside air into the housing 18 from the outside air intake port 19 (step S220), and returns to step S201. In other words, when the outside air lead-in mode is switched to the inside air circulating mode in step S204, the inside air circulating mode is switched to the outside air lead-in mode in step S220 for the first time.

With such a configuration, when the exhaust gas concentration on the outside of the vehicle is high, the control system 30B switches the external air lead-in mode to the inside air circulating mode and calculates window mist limit humidity at that point. When the inside humidity is close to the window mist limit humidity, the control system 30B actuates the compressor 11E, increases the number of revolutions, blows out the air from the DEF blowout port 22 into the cabin, and increases the air volume in the blower 16 to prevent the mist on the windshield and delays the switching to the external air lead-in mode as much as possible. This makes it possible to continuously perform the air conditioning operation in the inside air circulating mode as much as possible while suppressing the mist on the windshield and prevent deterioration in the inside air quality.

Further, when the compressor 11E is actuated, only when the inside humidity is close to the window mist limit even if the compressor 11 is actuated, the control system 30B sequentially increases the number of revolutions of the compressor 11E to suppress the mist from occurring on the windshield. In other words, when the inside humidity falls below the window mist limit, the control system 30B performs control not to further increase the number of revolutions of the compressor 11E. It is possible to suppress an increase in power consumption.

As a result, even when the compressor 11E is electrically driven, it is possible to perform the air conditioning operation in the inside air circulating mode to prevent deterioration in the inside air quality and perform comfortable air conditioning while realizing power saving and while suppressing the mist on the windshield.

In the embodiments, the entire configuration of the air conditioner 10 is illustrated. However, sections not affecting the gist of the present invention may have any other configuration.

The thresholds described above can be set as appropriate. It goes without saying that the order of control can be changed as appropriate. For example, the steps S111, 114, 117, 211, 214, and 217 can be omitted.

Besides, it is possible to select the components described in the embodiment or change the components to other components as appropriate.

The invention claimed is:

1. A vehicle air conditioner comprising:
a control unit that performs control actions comprising:
switching between an outside air conditioning mode for leading in outside air to perform air conditioning and an inside air circulating mode for circulating air in a vehicle to perform air conditioning,
calculating surface temperature on an interior side of a window glass on the basis of, among outside temperature, inside temperature, and vehicle speed, at least the outside temperature and the inside temperature;
determining window mist occurrence limit humidity at which a mist occurs on the window glass from absolute humidity at which dews concentrate at the surface temperature;
repeatedly determining if an inside humidity is within a predetermined range with respect to the mist occurrence limit humidity and if so, performing operation control for reducing the inside humidity, wherein determining if the inside humidity is within the predetermined range and performing the operation control includes:
determining if the inside humidity is within the predetermined range and, if so, the control unit controls actuation of a compressor to circulate a coolant to an evaporator;
thereafter re-determining if the inside humidity is within the predetermined range and, if so, the control unit executes the control using the inside humidity and the mist occurrence limit humidity when the air conditioning is performed in the inside air circulating mode;
thereafter, re-determining if the inside humidity is within the predetermined range and if so, the control unit controls a blowing-out direction of the air into the vehicle to change the blow-out direction;
thereafter re-determining if the inside humidity is within a predetermined range and, if so,
the control unit controls an air volume to change the air volume; and
thereafter re-determines if the inside humidity is within a predetermined range with respect to the mist occurrence limit humidity and, if so
the control unit performs the air conditioning by switching the inside air circulating mode to the outside air conditioning mode; and
detecting if an exhaust gas concentration is equal to or higher than a predetermined threshold and, if so, the control unit switches the outside air conditioning mode to the inside air circulating mode and calculates the mist occurrence limit humidity.

2. The vehicle air conditioner according to claim 1, wherein the compressor is engine-driven, and the control unit executes at least one of switching of the compressor to ON, setting of a blowing-out direction of the air toward a surface on the interior side of the window glass, and an increase in the air volume as the operation control for reducing the inside humidity.

3. The vehicle air conditioner according to claim 1, wherein the compressor is electrically-driven, and the control unit executes at least one of an increase in the number of revolutions of the compressor, setting of a blowing-out direction of the air toward a surface on the interior side of the window glass, and an increase in the air volume as the operation control for reducing the inside humidity.

4. The vehicle air conditioner according to claim 1, wherein, for detecting if an exhaust gas concentration is equal to or higher than a predetermined threshold, when the exhaust gas concentration is not equal to or higher than the predetermined threshold, the control unit continues the outside air conditioning mode for taking outside air into a housing from an outside air intake port without switching an intake port switching damper.

* * * * *